March 11, 1930.  F. ARNAIZ  1,749,965
SAFETY PARACHUTE
Filed July 25, 1928   2 Sheets-Sheet 2
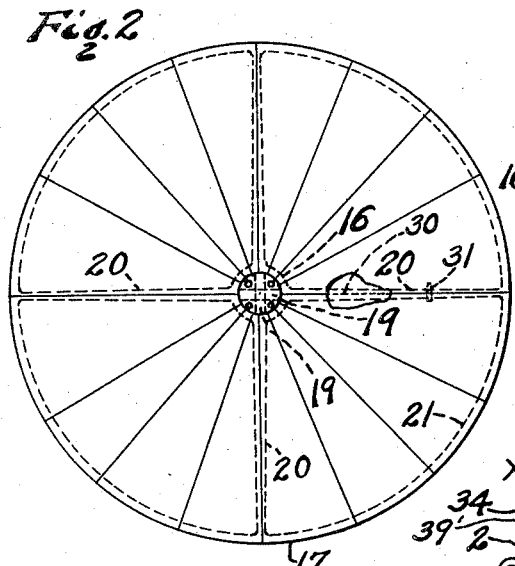
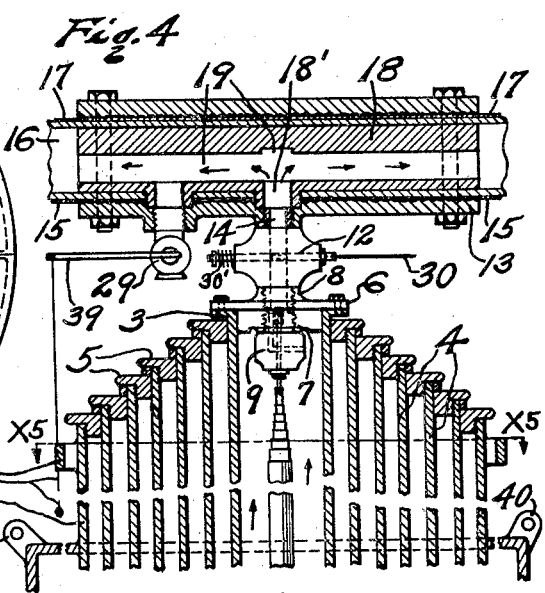
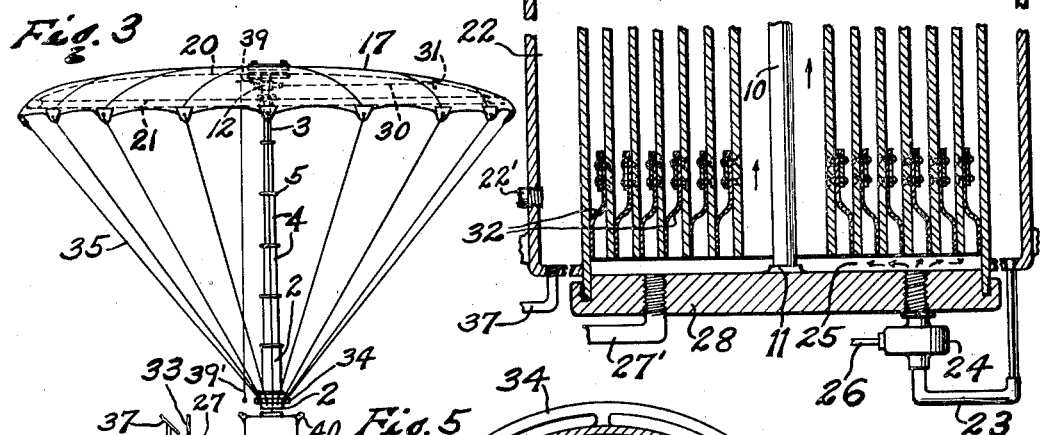
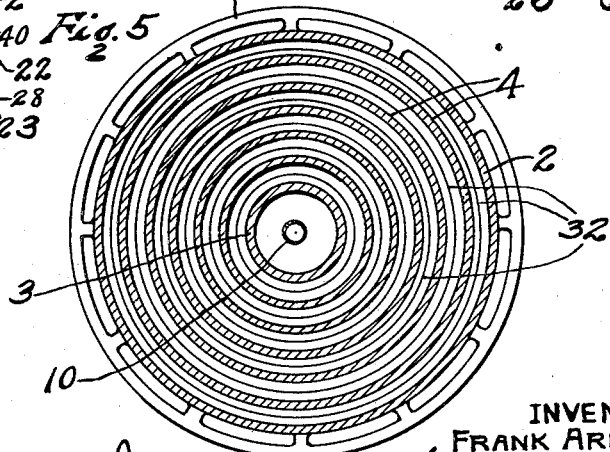
INVENTOR
FRANK ARNAIZ Patented Mar. 11, 1930

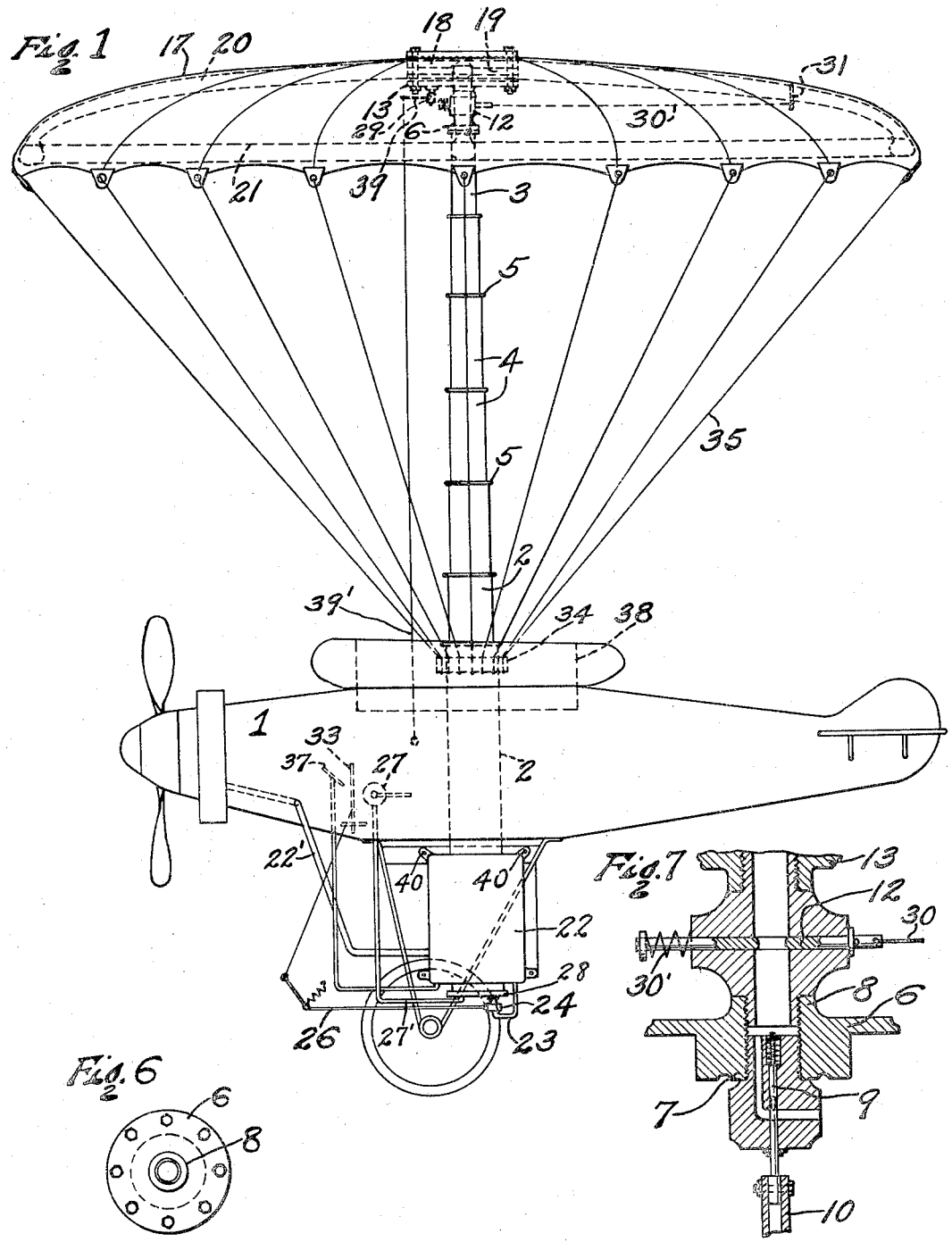

1,749,965

UNITED STATES PATENT OFFICE

FRANK ARNAIZ, OF LOS ANGELES, CALIFORNIA

SAFETY PARACHUTE

Application filed July 25, 1928. Serial No. 295,140.

An object of this invention is to make provision to prevent damage to airplanes and passengers from accidental fall.

The principal of this invention is the application of pneumatic means to instantly free a parachute and cause its expansion so that it will become quickly effective to prevent damage from falls from altitudes which ordinarily would not be sufficient to allow time for expansion of the parachute before the plane or other load to which the parachute is connected, would strike the ground.

In carrying out this invention various means may be employed to apply the pneumatic pressure to effect the purposes above suggested.

The invention is applicable to monoplanes and biplanes and other forms of air craft adapted to carry a parachute for safe descent in case of accident.

Difficulties to be overcome are delay in expanding the parachute; and danger of entanglement of the parachute with the plane, and the invention is applicable to both biplane and monoplane types of machines now in use.

An object is to make provision whereby a sufficient application of compressed air to insure proper action to project the parachute away from the plane and to then distend the parachute, may be employed without danger that the parachute distending means may become ruptured by excessive air pressure; and this I do by providing a pair of valves in the air line and providing connections whereby the compressed air is normally shut off from the distending tubes until the collapsed parachute has been projected clear away from the plane; and then to automatically turn air into the distending tubes until the parachute is properly distended, and to then automatically shut off the air before sufficient excessive pressure is applied to rupture the distending tubes.

In carrying out the invention I propose to connect the parachute with the airplane by means of a telescopic standard; and to provide means carried by the plane, for extending the standard and expanding the parachute, and I employ a medium such as air under pressure through means connected with the telescopic standard to supply air thereto to extend the standard for the purpose of moving the parachute proper away from the device it is to support, so that the parachute will not become entangled; and the parachute is provided with an arrangement of tubes into which the compressed air will be directed for the purposes of expanding the parachute so that it will open out and take hold upon the air almost instantaneously.

An advantage is that the airplane or other body to be supported may be caught before it has gained great momentum, thus avoiding the heavy stress and strain that would otherwise be imposed on the parachute.

Other objects, advantages and features of invention may appear from the accompanying drawings, the subjoined detailed description and the appended claims.

The accompanying drawings illustrate the invention.

Figure 1 is a side elevation of an airplane provided with the invention, and in falling support position; dotted lines indicate the cache emptied by bringing the parachute into action.

Fig. 2 is a plan of the parachute expanded.

Fig. 3 is a side elevation of the parachute expanded, omitting the plane.

Fig. 4 is an enlarged fragmental mid-sectional detail in elevation, of the standard and connected parts.

Fig. 5 is a cross-section of the standard on line $x^5$, Fig. 4.

Fig. 6 is a plan view of the standard cap piece, detached.

Fig. 7 is an enlarged axial section of the air control valves at the top of the standard.

1 indicates the fuselage or body of an airplane. 2 indicates an outer member of a telescopic standard. 3 indicates a central member of such standard. 4 indicates intermediate tubular members and 5 indicates top annular collars fixed to the outer and the intermediate tubular members, and fitting the intermediate and inner tubular members respectively.

The inner tubular member 3 is provided with an annular cap piece 6 having a central orifice provided with lower and upper collars 7 and 8. 9 is a normally closed valve connected by a telescopic rod 10 of limited extension, to a stationary part 11, so that when the valve 9 is moved away from the stationary part 11 or vice versa, a predetermined distance, the fully extended telescopic rod will open the valve 9. A normally open valve 12 is screwed into the upper collar 8 and a clamp plate 13 is threaded onto the outlet 14 of the valve 12. 15 is a reinforced lower sheet of an air pocket 16 formed between the lower and upper sheets 15 and 17 of said air pocket. 18 is an intermediate plate having a central orifice communicating through channels 19 with the interior of the air pocket and with inflating tubes 20 leading from said air pocket to the tubular rim 21 of the parachute.

22. Indicates a compressed-air holder supplied through a valved air line 22' with compressed air from an air pump not shown, operated by the plane engine not shown. Said holder 22 is connected through a pipe 23 to a normally closed valve 24 adapted to discharge compressed air into an air chamber 25 that is arranged to apply air pressure to the lower ends of the tubes forming the telescopic standard, thus to extend such standard whenever the valve 24 is opened. 26 indicates means by which the operator can open the valve 24 to extend the standard and project the parachute to clear the fuselage 1. Valve 27 controls a collapsing vent 27'.

The upward movement of the cap piece 6 is continued by action of the compressed air after the connection 10. between the base 28 and the valve 9 has reached its full length and the valve 9 is thereby opened; thus allowing air from the telescopic standard to be discharged through the normally opened valve 12 and the orifice 18', channels 19 and pocket 16 into the inflating chamber including the distending tubes 20 and their surrounding rim tube 21, thus unfolding and spreading the parachute sheet immediately after the same has cleared the fuselage. The parachute is then in supporting position.

29 is a spring closed collapsing valve connected to the clamp plate 13 and adapted to be opened by the operator to release the air from the tubes 20 and 21 thus allowing the parachute to collapse. 30 indicates a cord that is fixed at one end to the valve 12 and at the other end to a portion of the parachute near the rim thereof and such cord 30 is of a length less than the distance from the valve to the attachment 31 of the cord to the sheet, so that when the sheet is fully extended the cord will be drawn to close the normally open valve 12 against the pressure of the valve spring 30', thus preventing further flow of air from the standard into the air chambers of the parachute.

The inner and intermediate tubes of the telescopic standard are provided at the lower ends with cups 32 so that said tubes operate as pistons to be acted upon by the air from the chamber 25 when the valve 24 is opened by the pilot operating a lever 33. When compressed air is applied to the under sides of the cups, the telescopic standard is extended almost instantaneously.

The annular caps 5 are alike except as to size, and each is fixed to the tube or section in which it is inserted and it serves as a guide for the body of the telescopic tube which fits inside such cap. Said caps may be secured in their respective tubes by any suitable means and the tube surrounded by said cap is held in true position thereby as the telescoping action takes place. The outer tube 2 is provided with means, as the rail 34 to which the shrouds 35 of the parachute are fastened.

22' indicates the valved air line for supplying air to the compressed-air holder and 37 is a gauge to indicate to the operator the amount of pressure in such holder.

38 indicates the cache in which the parachute will be normally stored in collapsed position.

The handle 39 that controls the spring-closed collapsing valve 29, is shown provided with a line 39' within reach of the operator, so that the sheet may be collapsed before it has been lowered by releasing air from the standard, and the air may be released from the standard gradually to lower the sheet, thus to allow the attendant to fold it into the cache, ready to be again projected.

40 indicates eyes to hold the lashings by which the air chamber may be made fast to the fuselage of the airplane.

In Fig. 3 the plane is broken out and omitted to contract the view.

In practical use, when control of the plane is lost, and the plane begins to fall, the pilot will operate lever 33, thus opening the valve 24 and allowing air to flow from the compressed air holder 22 into the air applying chamber 25 and the telescopic tubular standard is extended by compressed air which fills the space inside the inner tube 3 and at the close of the extension of the tubular standard the connection 10 reaches the limit of its extension and opens the valve 9 to allow the compressed air in the tube 3 to pass through into the chamber 19 and thence to expand the tubes 20, 21 of the parachute to practically instantaneously open said sheet which has thus been removed from the cache 38.

After the descending plane has come to rest on a solid support, the operator may pull the line 39' and open the valve 39, thus collapsing the sheet, and then by opening valve 27, air is released from the standard and the standard is thus allowed to collapse, thus lowering the parachute sheet according to the air released, and as the standard collapses an attendant may see to it that the sheet is properly stored in the cache or other place prepared to hold it.

The spreading and descending sheet catches the air which thus helps to spread the sheet so that the descent is almost instantly checked. When the sheet is fully spread the normally open valve 12 is closed by the line 30 and may only be released by opening valve 29.

It is understood that various modifications and changes may be made without departing from the spirit of the invention and I do not limit the invention to the specific constructions shown in the drawings.

I claim:—

1. The combination with a parachute sheet; of a telescopic tubular standard; means for supplying compressed air to the standard to extend the same to lift the sheet; pneumatic means to spread the parachute sheet after the standard has been extended and means operable by the extension of the standard to start the penumatic spreading means into operation to spread the sheet.

2. The combination with a parachute sheet; of a telescopic standard; means for supplying compressed air to the standard to extend the same to lift the sheet; pneumatic means to spread the parachute sheet after the standard has been extended and means operable by the extension of the standard to start the pneumatic spreading means into operation to spread the sheet, and means to shut off the supply of air from the spreading means when the parachute sheet has been spread.

3. The combination with a parachute sheet; of a telescopic standard; means for supplying compressed air to the standard to extend the same to lift the sheet; pneumatic means to spread the parachute sheet after the standard has been extended and means operable by the extension of the standard to start the pneumatic spreading means into operation to spread the sheet, and automatic means operable by the extended parachute, to shut off the supply of air from the spreading means when the parachute sheet has been spread.

4. The combination with an air chamber, of a standard made of telescopic tubes open to the chamber and closed at the top so that when air is received from the chamber the standard will be extended; a parachute sheet provided with air chambers arranged to spread the parachute sheet when filled with compressed air, and means whereby compressed air may be introduced into the standard to extend the same and whereby air from such standard may be introduced into the chambers to spread the sheet after the standard has been extended.

5. The combination with an air chamber, of a standard made of telescopic tubes open to the chamber and closed at the top so that when air is received from the chamber the standard will be extended; a parachute sheet provided with air distending chambers adapted and arranged to spread the parachute sheet when filled with compressed air; and means whereby compressed air may first be introduced into the standard to extend the same and whereby air from such standard may be introduced into the distending chambers to spread the sheet after the standard has been extended; and means to shut off the supply of air.

In testimony whereof, I have hereunto set my hand at Los Angeles, California, this 19th day of July, 1928.

FRANK ARNAIZ.